UNITED STATES PATENT OFFICE.

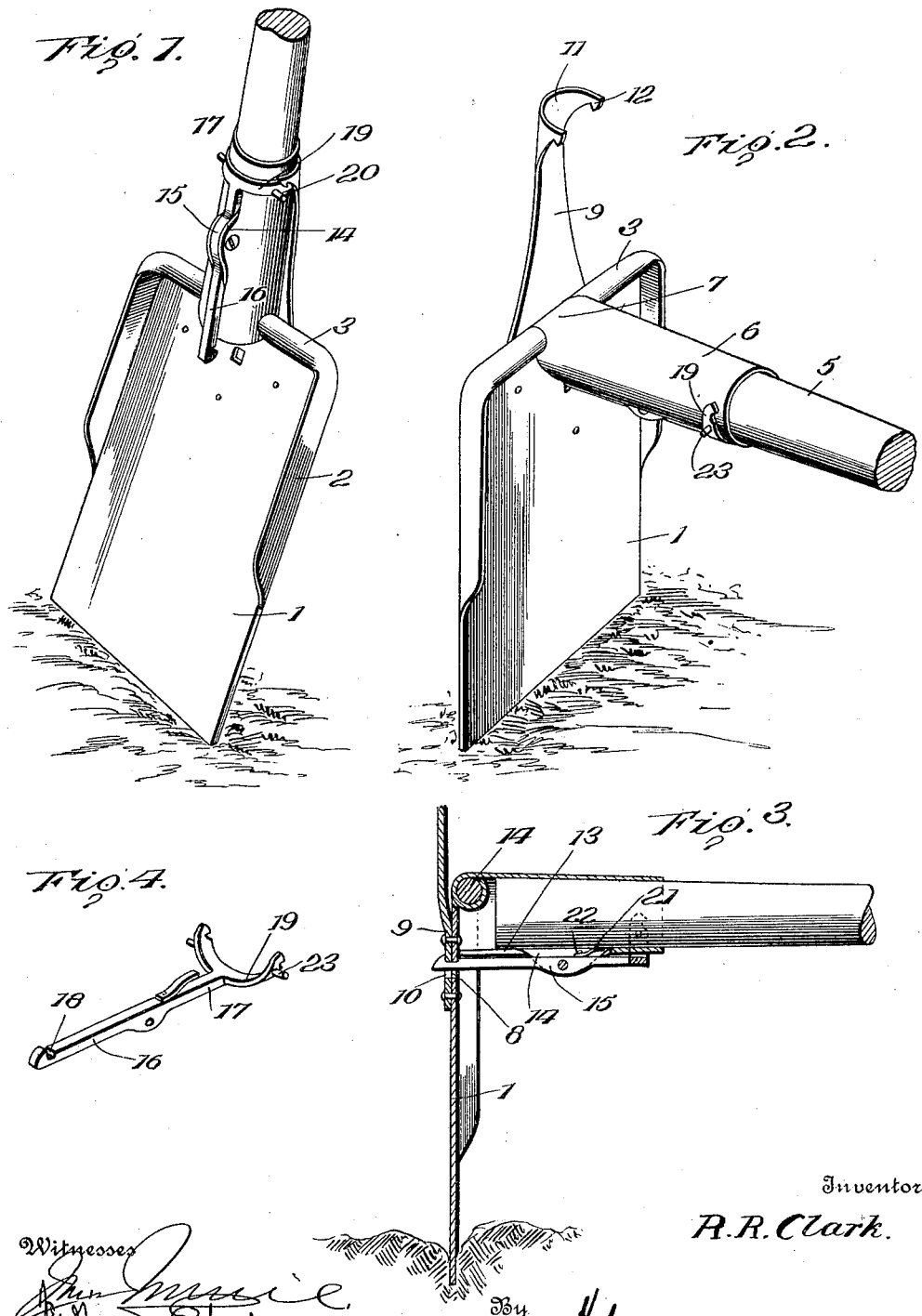

RANSOM R. CLARK, OF SANTA PAULA, CALIFORNIA.

COMBINED SHOVEL AND HOE.

1,083,920.  Specification of Letters Patent.  Patented Jan. 13, 1914.

Application filed December 26, 1912. Serial No. 738,767.

*To all whom it may concern:*

Be it known that I, RANSOM R. CLARK, a citizen of the United States, residing at Santa Paula, in the county of Ventura and State of California, have invented certain new and useful Improvements in Combined Shovels and Hoes, of which the following is a specification.

This invention relates to combined hoes and shovels, and has as its object to provide an implement of this type in which a single blade performs, upon proper adjustment, the functions of a hoe blade or shovel blade.

It is a further aim of the invention to provide an implement of the type mentioned so constructed that the blade will be securely held at either of its positions of adjustment, and wherein the means for holding the blade at adjustment is so constructed as to firmly brace the blade against the different stresses exerted against it, when in use, in either of its positions of adjustment.

A further aim of the invention is to provide a unitary means for holding the blade in position for use as a hoe blade or as a shovel blade.

For a full understanding of the invention reference is to be had to the following description and accompanying drawing, in which:—

Figure 1 is a perspective view of the implement embodying the present invention, the same being arranged for use as a shovel. Fig. 2 is a similar view illustrating the same arranged for use as a hoe. Fig. 3 is a vertical longitudinal sectional view through the implement arranged for use as a hoe. Fig. 4 is a perspective view of the latch for holding the blade in its two positions of adjustment.

Corresponding and like parts are referred to in the following description and indicated in all the views of the accompanying drawing by the same reference characters.

In the drawing, the blade of the implement is indicated by the numeral 1 and while it is here illustrated as flat and provided with a rectangular working edge, it will be understood that it may assume some other form, if desired. However, the lateral edges of the blade 1 are provided with forwardly extending flanges 2 and the upper edge portion of the blade is overturned as at 3 so as to form pintle lugs which receive the hinge-pin for the blade.

The hinge-pin mentioned is indicated in the drawing by the reference numeral 4 and by referring to Fig. 3 it will be apparent that this pin extends between the adjacent or opposed ends of the overturned portions of the pintle lugs 3 and it is to this portion of the pin that the handle of the implement is connected.

The handle is indicated in general by the numeral 5 and is provided with a ferrule 6 in the mouth of a sleeve having at one end an extended portion 7 of a width substantially equal to the distance between the adjacent ends of the overturned portions 3 of the blade 1. This portion 7 of the ferrule is bent around the intermediate portion of the hinge-pin 4, as clearly shown in Fig. 3 of the drawing, and in this manner the blade is hingedly supported upon the handle so that it may assume either the position shown in Fig. 1, in which position the implement may be used as a shovel or the position shown in Fig. 2 in which it may be used as a hoe.

As illustrated in Figs. 1 and 3 of the drawing the blade is formed immediately below its upper edge at a point midway between its lateral edges with an opening 8 which is preferably rectangular. A keeper-plate 9 is riveted or otherwise secured to the rear face of the plate 1 and is provided with an opening 10 which registers with the opening 8. The keeper-plate 9 projects substantially vertically above the blade and at and adjacent its upper end is transversely curved, as at 11 to conform to the contour of and receive the ferrule 6 when the blade is in position for use as a shovel blade. At the ends of its transversely curved portion 11 the keeper-plate is provided with hook-lugs 12 which serve a purpose to be presently explained. The ferrule 6 is divided as at 13 and is stamped up to form spaced ears 14 between which is pivotally mounted a latch-lever 15, the lever having a portion 16 extending below its pivot and a portion 17 extended above its pivot. The portion 16 of the latch-lever is provided at its lower end with a notch 18, the walls of which are designed to engage with the walls of the openings 8 and 10, in the manner illustrated in Fig. 3 of the drawings when the blade is to be used as a hoe-blade. The portion 17 of the latch-lever is provided near its upper end with oppositely extending arcuate arms 19 provided at their ends with hooks 20, these arms being curved to correspond to the curvature of the ferrule 6 and being arranged to receive the forward side of the ferrule, as shown in Figs. 1 and 2. A leaf-spring 21 is secured as at 22 to the inner side of the latch-lever 15 and bears against the handle 5 as shown in Fig. 3 and this spring normally holds the lower portion of the latch-lever yieldably in the direction of the ferrule 6 and its upper portion yieldably in a direction away from the said ferrule.

From the foregoing description of the invention it will be seen that when the implement is to be used as a hoe, the blade is swung to extend substantially at right angles to the handle 5, whereby the lower end of the portion 16 of the latch-lever will spring into engagement in the openings 8 and 10 and the blade will be held at this position of adjustment. The arms 19 of the latch-lever at their ends are provided with laterally projecting finger-knobs 23 and when it is desired to arrange the implement for use as a shovel, pressure is exerted against these knobs 23 to disengage the lower end of the portion 16 of the lever from the keeper-plate 9 and the wall of the opening 8 in the blade 1. The blade is then swung to assume approximately the position shown in Fig. 1 of the drawings and as it assumes this position, the hook-lugs 12 of the keeper-plate 9 will snap into engagement with the hook ends 20 of the latch-arms 19.

By referring to Fig. 1 it will be apparent that when the implement is in use as a shovel the weight of material supported upon the blade will tend to cause the keeper-plate 9 to bear firmly against the ferrule 6 so that the blade is firmly braced in this position of adjustment. On the other hand, when the blade is in position for use as a hoe-blade, the forward pull exerted against the blade is directly in alinement with the latch-lever and there is no tendency for the lever to disengage from the keeper-plate 9. It will be apparent that the blade may be readily and quickly adjusted to either of its positions and that when in either position of its adjustment will be securely braced and held. It will also be noted that but a single latch-lever is employed for holding the blade at both adjustments and that the single keeper-plate coöperates with the latch-lever in both positions of adjustment.

Having thus described the invention what is claimed as new is:

1. In an implement of the class described, a handle, a blade mounted upon the handle for angular adjustment, a keeper carried by the blade, and a latch having independent engaging elements for coöperation with the keeper when the blade is at one or the other of its positions of adjustment.

2. In an implement of the class described, a handle, a blade mounted upon the handle for angular adjustment, a keeper plate having a socket and having a portion projecting beyond the blade and provided with keeper-members, and a latch mounted upon the handle and having an element engageable in the socket, and an element engageable with the keeper members of the keeper-plate.

3. In an implement of the class described, a handle, a blade mounted upon the handle for angular adjustment, a keeper carried by the blade and having spaced keeper portions, and a latch-lever pivoted upon the handle and having latch-elements located at opposite sides of its pivot point and engageable with the said portions of the keeper.

4. In an implement of the class described, a handle, a blade mounted upon the handle for angular adjustment, a latch carried by the handle and engageable with the blade to hold it at one position of adjustment, a keeper-plate carried by the blade and having a portion arranged to embrace the handle, and means constituting an element of the latch engageable with the handle embracing portion of the keeper-plate.

5. In an implement of the class described, a handle, a blade mounted upon the handle for angular adjustment, a latch carried by the handle and engageable with the blade to hold it at one position of adjustment, a keeper-plate carried by the blade and having a portion arranged to embrace the handle, and means constituting an element of the latch engageable with the handle embracing portion of the keeper-plate and embracing that side of the handle opposite the side embraced by the said keeper-plate.

6. In an implement of the class described, a handle, a blade mounted upon the handle for angular adjustment, a latch-lever mounted upon the handle for pivotal movement and provided at one side of its pivot with a latch-element, a keeper-plate carried by the blade and provided with a socket in which the latch-plate is engageable, whereby to hold the blade at one position of adjustment, and means carried by the latch-lever embracing the handle at the opposite side of the pivot, the said keeper-plate being arranged to embrace the opposite side of the handle and engage with the said handle embracing latch element.

7. In an implement of the class described, a blade having its upper edge portions overturned to form spaced pintle lugs, a handle ferrule having a portion overturned to form a pintle lug disposed between the pintle lugs upon the blade, a pintle-pin fitted in the said lugs whereby the blade is mounted for angular adjustment upon the handle ferrule, and means for holding the blade at adjustment.

In testimony whereof I affix my signature in presence of two witnesses.

RANSOM R. CLARK. [L. S.]

Witnesses:
JOHN H. SMITH,
CHARLES H. WILLARD.

Copies of this patent may be obtained for five cents each, by addressing the "Commissioner of Patents, Washington, D. C."